(12) United States Patent
Cunico et al.

(10) Patent No.: US 11,093,594 B2
(45) Date of Patent: Aug. 17, 2021

(54) COGNITIVE USER IDENTIFICATION RECOMMENDATION

(71) Applicant: International Business Machines Corporation, Armonk, NY (US)

(72) Inventors: Hernan Cunico, Holly Springs, NC (US); Paul Alexander Frank, Hamburg (DE); Martin Keen, Cary, NC (US); Richard D. Johnson, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 16/179,980

(22) Filed: Nov. 4, 2018

(65) Prior Publication Data

US 2020/0143020 A1    May 7, 2020

(51) Int. Cl.
 *G06F 21/00* (2013.01)
 *G06F 21/31* (2013.01)
 *G06F 21/46* (2013.01)

(52) U.S. Cl.
 CPC ............ *G06F 21/316* (2013.01); *G06F 21/46* (2013.01)

(58) Field of Classification Search
 CPC ............................... G06F 21/316; G06F 21/46
 See application file for complete search history.

(56) References Cited

U.S. PATENT DOCUMENTS

| | | | | |
|---|---|---|---|---|
| 6,151,593 | A * | 11/2000 | Cho | G06F 21/32 706/16 |
| 8,050,920 | B2 * | 11/2011 | Yoma | G07C 9/37 704/246 |
| 10,223,875 | B1 * | 3/2019 | Mossoba | G06Q 20/382 |
| 10,257,181 | B1 * | 4/2019 | Sherif | G06F 21/316 |
| 2007/0236330 | A1 * | 10/2007 | Cho | H04L 63/08 340/5.54 |
| 2008/0298588 | A1 * | 12/2008 | Shakkarwar | H04L 9/0869 380/255 |
| 2017/0289161 | A1 | 10/2017 | Yoskowitz et al. | |

(Continued)

OTHER PUBLICATIONS

Briland Hitaj et al., "PassGAN: A Deep Learning Approach for Password Guessing," Cornell University Library; Mar. 9, 2018.

(Continued)

*Primary Examiner* — Mahfuzur Rahman
(74) *Attorney, Agent, or Firm* — Kelli D. Morin

(57) ABSTRACT

Embodiments of the present invention provide a method, system and computer program product for cognitive user identification recommendation. In an embodiment of the invention, a method for cognitive user identification recommendation includes monitoring typing patterns of an end user as the end user enters data in different fields of different applications of a computing device having a device type and categorizing each of the fields and applications according to field type and application type. The method further includes generating a data structure mapping the user typing patterns to each type of field and application to model user input behavior of the end user. The method also includes transmitting the data structure to a requesting application for prompting the end user to provide a particular type of password mapped to the modeled user input and consistent with a field type of the password and a type of requesting application.

20 Claims, 2 Drawing Sheets

(56) References Cited

U.S. PATENT DOCUMENTS

2018/0160309 A1* 6/2018 Turgeman ............. G06F 21/554
2019/0342276 A1* 11/2019 Sherif ................... G06F 21/316

OTHER PUBLICATIONS

Christoffer Olsen, "A Machine Learning Approach to Predicting Passwords," imm.dtu; Jan. 2018.

Melicher et al., "Fast, Lean, and Accurate: Modeling Password Guessability using Neural Networks," usenix.org; Aug. 2016.

Crouch, M., "7 easy tricks to remember numbers, codes, passwords—CreditCards.com," http://www.creditcards.com/credit-card-news/7-easy-tricks-to-remember-numbers-1267.php, printed Jan. 22, 2020, 2 pgs.

Lebiere et al., "Cognitive Models of Prediction as Decision Aids," http://www.creditcards.com/credit-card-news/7-easy-tricks-to-remember-numbers-1267.php, Proceedings of the 14th International Conference on Cognitive Modeling (ICCM 2016), 6 pgs.

Pi et al., "Theory of Cognitive Pattern Recognition," http://www.creditcards.com/credit-card-news/7-easy-tricks-to-remember-numbers-1267.php, Pattern Recognition Techniques, Technology and Applications, ISBN 978-953-7619-24-1, pp. 626, Nov. 2008, 32 pgs.

* cited by examiner

COGNITIVE USER IDENTIFICATION RECOMMENDATION

BACKGROUND OF THE INVENTION

Field of the Invention

The present invention relates to the field of username and password generation in an application and more particularly to the variable proposition of a password for use in authenticating into an application.

Description of the Related Art

Cognitive science incorporates aspects of psychology, neurology and computer science, as well as many other branches of sciences, to study how the human brain and psyche function. Pattern recognition is a fundamental aspect of cognitive science and forms the basis of our understanding of many psychological phenomena. Essentially, cognitive pattern recognition occurs when an event perceived in short-term memory is matched to a pattern stored in long-term memory. Pattern recognition allows the brain to recognize and predict many events that occur in everyday life. Pattern recognition also allows for a more efficient way for human to store memory into long-term memory.

In our daily life, humans are flooded with many new things to remember that are not easily stored in long-term memory. Therefore, in regards to usernames and passwords, oftentimes end users will use easy-to-remember passwords throughout various platforms, which may be easily broken by current cryptography methods. In order to provide end users with more complex passwords, programs may automatically generate secure passwords. However, as these random generated passwords are hard to remember, users will often choose to use their own, less-secure password because their own password is easier to remember. Alternatively, the end user may store the generated password in an unsecure location. Thus, there is a need for secure passwords that are easy for an end user to remember.

BRIEF SUMMARY OF THE INVENTION

Embodiments of the present invention address deficiencies of the art in respect to username and password recommendation and provide a novel and non-obvious method, system and computer program product for cognitive user identification recommendation. In an embodiment of the invention, a method for cognitive user identification recommendation includes monitoring typing patterns of an end user as the end user enters data in different fields of different applications of a computing device having a device type and categorizing each of the applications according to application type and each of the fields according to field type. The method further includes generating a data structure mapping the user typing patterns to each type of field and each type of application, the data structure modeling user input behavior of the end user. The method even further includes transmitting the data structure to a requesting application for use by the requesting application in prompting the end user to provide a particular type of password mapped to the modeled user input and consistent with a field type for which the password is required and a type of the requesting application.

In one aspect of the embodiment, the typing patterns of the end user are further monitored in different devices, each of the devices are categorized according to device type, the generated data structure further maps the user typing patterns to each type of device, and the particular type of password is further consistent with a type of device in which the requesting application executes. In another aspect of the embodiment, the user typing patterns comprise an amount of repetitions of a field before a field is correctly entered. In yet another aspect of the embodiment, the user typing patterns comprise typing speeds of different characters. In even yet another aspect of the embodiment, the user typing patterns comprise a preferred character.

In another embodiment of the invention, a data processing system configured for cognitive user identification recommendation has been claimed. The system includes a host computing system comprising memory and at least one processor, fixed storage coupled to the host computing system and a user behavior analysis and user identification recommendation module. The module includes computer program instructions executing in the memory of the host computing system that upon execution are adapted to perform: monitoring typing patterns of an end user as the end user enters data in different fields of different applications of a computing device having a device type, categorizing each of the applications according to application type and each of the fields according to field type, generating a data structure mapping the user typing patterns to each type of field and each type of application, the data structure modeling user input behavior of the end user and transmitting the data structure to a requesting application for use by the requesting application in prompting the end user to provide a particular type of password mapped to the modeled user input and consistent with a field type for which the password is required and a type of the requesting application.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide cognitive user identification recommendation by analyzing the typing or input patterns of an end user in order to identify the preferred typing or input patterns of the end user. In accordance with an embodiment of the invention, the typing patterns of users in different types of fields of different types of applications of different types of devices are monitored, categorized and mapped in a data structure. From the mapping, the preferred typing patterns of the end user are determined for different types of fields of different types of applications of different types of devices. Thereafter, in response to a request for a user identification recommendation for a field of an application of a device, such as a username or password, the preferred typing pattern of the end user, along with the user identification requirements, such as password length and character types, are used to generate a recommendation. In this way, deep behavioral user analysis is used to generate an affinity model of preferred patterns of the end user, so that the end user can easily remember the recommended username or password.

Figure 1:
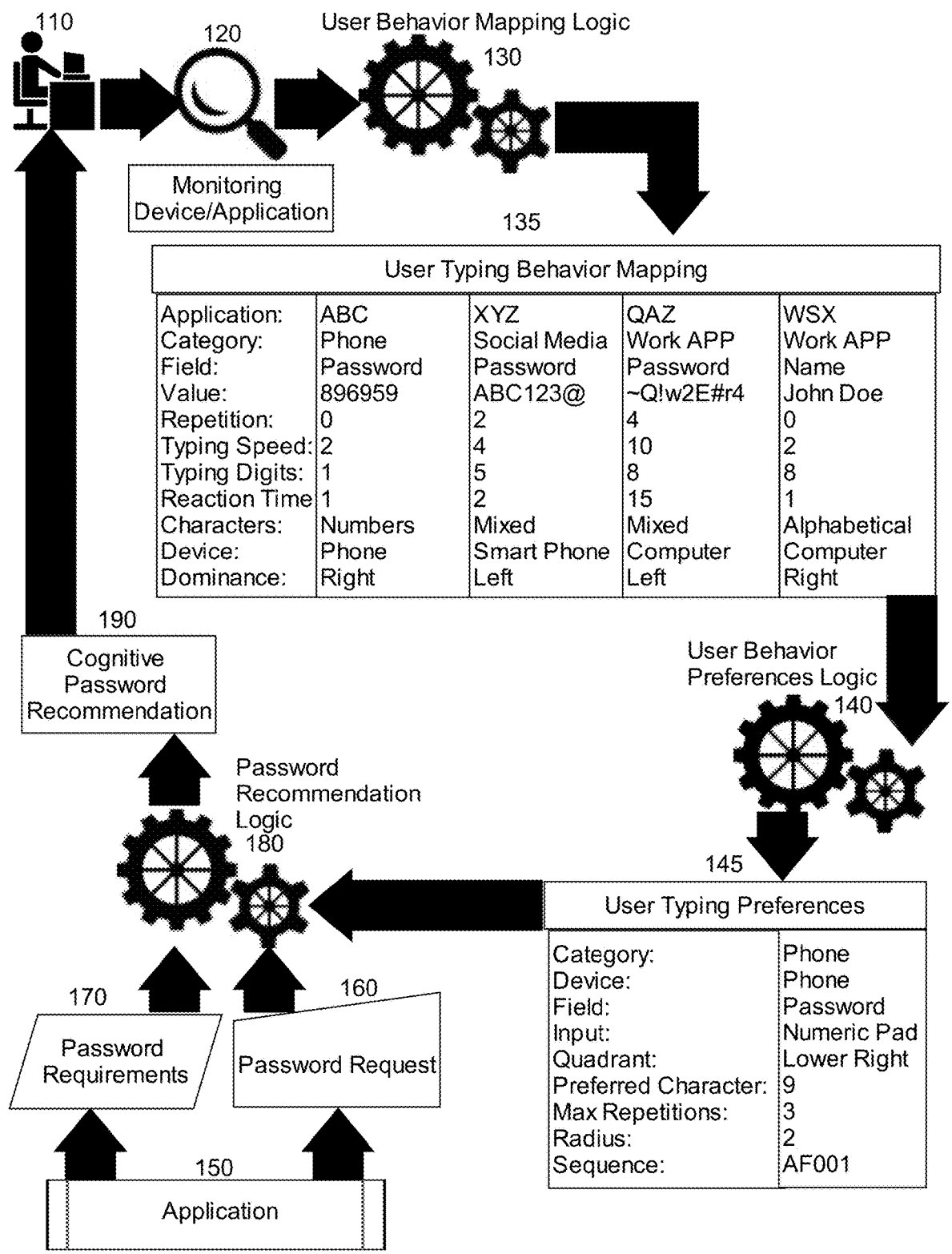
FIG. 1 is a pictorial illustration of a process for cognitive user identification recommendation.

In further illustration, FIG. 1 pictorially shows a process for cognitive user identification recommendation. The typing patterns of end user 110 in different fields of different application of different devices are monitored by a device or application 120. Device or application 120 may include any type of monitoring agent to capture how the user interacts with their various devices. User behavior mapping logic 130 analyzes the monitored behavior patterns of end user 110 in order to categorize and map the user's behavior in the different types of fields of the different types of applications of the different types of devices in user typing behavior mapping 135.

User behavior mapping logic 130 may utilize natural language processing in order to determine the types of fields, types of applications and types of devices that are being utilized by the end user. Examples of the types of devices may include computers, phones or tablets. Examples of the types of applications may include social media accounts, work applications, e-mail applications or a login for a phone. Examples of the types of fields may include login name, password, response validation, other input validated fields and generic fields. It is noted that the above examples of the types of devices, applications, and fields are non-exhaustive and may include any device, application or field that the end user is required to input information into a field.

As can be seen, user typing behavior mapping 135 includes an association matrix to analyze the user preference of the various categories. User typing behavior mapping 135 may include additional or fewer categories based on the determined relevance of the category. In the example shown in FIG. 1, user behavior mapping logic 130 through the monitoring device or application 120 extracts the following information into user types behavior mapping 135: the name of the application; the category or type of application; the type of field, such as password or username; the value or the user's input into that field; how many times the user repeated the input before it was accepted; the typing speed of the user; the number of digits the end user uses to type the input; the reaction time of the end user to begin entering the input; the types of characters in the input; the type of device; and the dominance of the user's hand. The values in the association matrix of user typing behavior mapping 135 are utilized to determine the user's preferred typing patterns.

User behavior preferences logic 140 may then utilize user typing behavior mapping 135 to determine the user's affinity for different inputs and patterns to various types of fields of types of applications of types of devices. As can be seen from the example shown in user typing preferences 145, for the password field, of a phone login application category, of a phone category of devices, the user preferences includes: input on the numeric pad; in the lower right quadrant; a preferred character of 9; a maximum repeated entries of 3; a radius of 2, which is the distance in characters of the furthest character from some central character or the preferred character; and sequence of AF001, which is the unique pattern identifier that may be stored in a central repository.

In response to an application 150 sending a password recommendation request 160, username recommendation request, or any request that involves the end user 110 to type an input into a field, password or user identification recommendation logic 180 utilizes user typing preferences 145 and the password or user identification requirements 170 to generate a cognitive password recommendation 190 for the end user 110. The password or user identification requirements 170 may include any requirements of the field of the application of the device, such as password length or character type requirements. The end user 110 may be further monitored to determine the end user's affinity with the recommended password and machine learning may be utilized to optimize the user identification recommendation logic 180.

Figure 2:
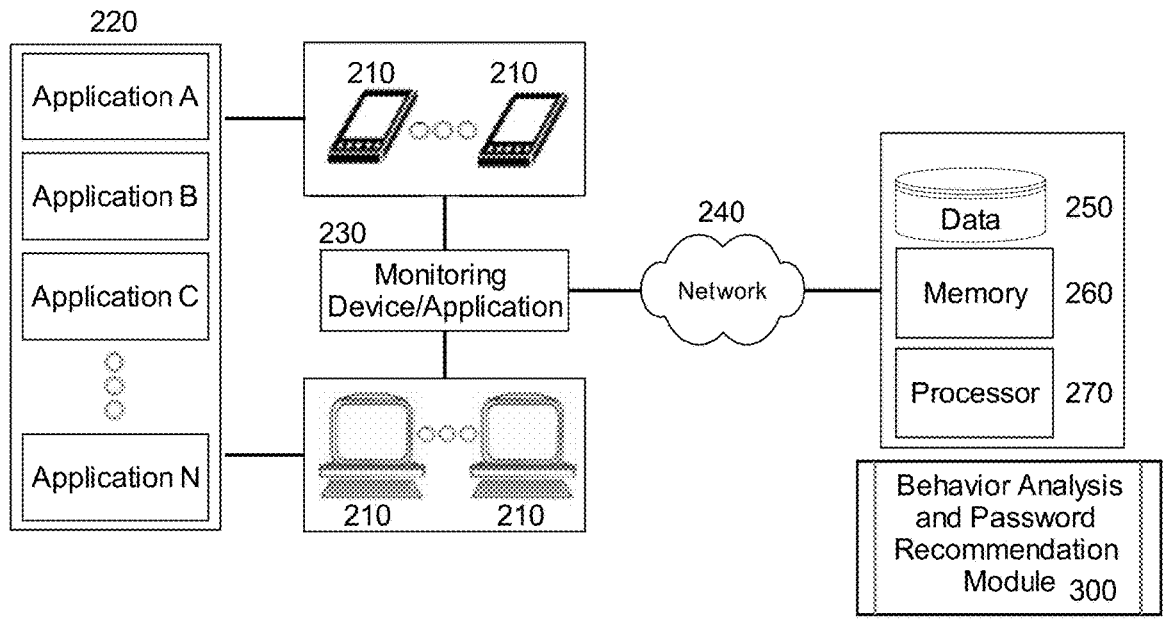
FIG. 2 is a schematic illustration of a data processing system configured for cognitive user identification recommendation; and, FIG. 3 is a flow chart illustrating a process for cognitive user identification recommendation.

The process shown in FIG. 1 may be implemented in a computer data processing system. In further illustration, FIG. 2 schematically shows a data processing system adapted for cognitive user identification recommendation. The system includes at least one processor 270 and memory 260 and fixed storage 250 disposed within the system. The system communicates over a network 240 with a monitoring device or application 230 that monitors the user behavior with different types of fields of different types of applications 220 in different types of devices 210.

Importantly, the behavior analysis and password/user identification recommendation module 300 is in communication with the system. The behavior analysis module and password/user identification recommendation module 300 categorizes and maps the user's behavior to the different types of fields of different types of applications of different types of devices. The behavior analysis module and password recommendation module 300 may utilize natural language processing to determine the type of field, type of application and type of device in order to categorize and map the input to the field, application and device. The behavior analysis module and password/user identification recommendation module 300 may then determine the end user's preferences for various types of fields of types of applications of types of devices. Thus, in response to a recommendation request for a field from an application 220 operating in a device 210, the behavior analysis module and password/user identification recommendation module 300 determines the user's preferences for the type of field, type of application and type of device and generates a cognitive user identification recommendation that complies with the requirements of the field of the application of the device.

Figure 3:
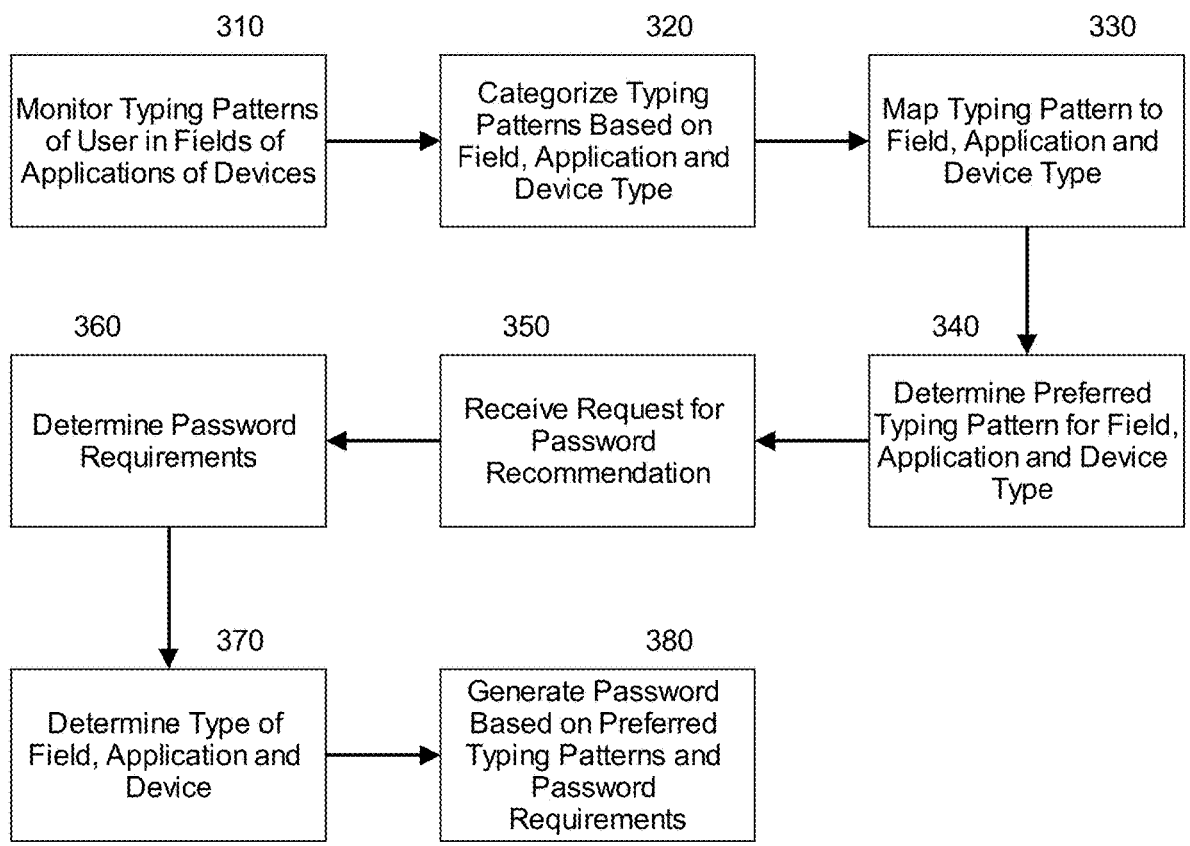

In even yet further illustration of the operation of the behavior analysis and password/user identification module 300, FIG. 3 is a flow chart illustrating an exemplary process for cognitive user identification recommendation. Beginning in block 310, the typing or input behavior patterns of an end user are monitored for different fields of different application of different devices. In block 320, the patterns of the end user are categorized based on the type of field, type of application and type of device. The type of field, type of application and type of device may be determined through natural language processing. In block 330, the patterns of the end user are mapped to each type of field of each type of application of each type of device.

In block 340, using the mapping of block 330, the preferred patterns of the end user are determined for each type of field of each type of application of each type of device. In block 350, a request for a password recommendation is received from an application that the end user is utilizing. In block 360, the password requirements are determined and, in block 370, the type of field, type of application and type of device of the request is determined. In block 380, using the preferred patterns of the end user, a cognitive recommendation, such as a username or password, is generated, so that the user is more likely to remember the user identification recommendation, as opposed to a random generated recommendation.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

We claim:

1. A method for cognitive user identification recommendation comprising:
    monitoring typing patterns of an end user as the end user enters data in different fields of different applications of a computing device having a device type;
    categorizing each of the applications according to application type and each of the fields according to field type;
    generating a data structure mapping the user typing patterns to each type of field and each type of application, the data structure modeling user input behavior of the end user; and,
    transmitting the data structure to a requesting application for use by the requesting application in prompting the end user to provide a particular type of password mapped to the modeled user input and consistent with a field type for which the password is required and a type of the requesting application, wherein prompting the end user includes providing a recommendation for the password based on the data structure.

2. The method of claim 1, wherein the typing patterns of the end user are further monitored in different devices, each of the devices are categorized according to device type, the generated data structure further maps the user typing patterns to each type of device, and the particular type of password is further consistent with a type of device in which the requesting application executes.

3. The method of claim 1, wherein the user typing patterns comprise an amount of repetitions of a field before the field is correctly entered.

4. The method of claim 1, wherein the user typing patterns comprise typing speeds of different characters.

5. The method of claim 1, wherein the user typing patterns comprise a preferred character.

6. The method of claim 1, further comprising:
    monitoring the end user to determine the end user's affinity for the recommended password.

7. The method of claim 1, wherein the recommendation is generated based on a password length requirement of the field of the application of the device.

8. The method of claim 1, wherein the recommendation is generated based on a password character type requirement of the field of the application of the device.

9. A data processing system configured for cognitive user identification recommendation, the system comprising:
    a host computing system comprising memory and at least one processor;
    fixed storage coupled to the host computing system;
    computer program instructions stored in the memory of the host computing system that upon execution cause the at least one processor to perform a method comprising:
        monitoring typing patterns of an end user as the end user enters data in different fields of different applications of a computing device having a device type;
        categorizing each of the applications according to application type and each of the fields according to field type;
        generating a data structure mapping the user typing patterns to each type of field and each type of application, the data structure modeling user input behavior of the end user; and,
        transmitting the data structure to a requesting application for use by the requesting application in prompting the end user to provide a particular type of password mapped to the modeled user input and consistent with a field type for which the password is required and a type of the requesting application, wherein prompting the end user includes providing a recommendation for the password based on the data structure.

10. The system of claim 9, wherein the typing patterns of the end user are further monitored in different devices, each of the devices are categorized according to device type, the generated data structure further maps the user typing patterns to each type of device, and the particular type of password is further consistent with a type of device in which the requesting application executes.

11. The system of claim 9, wherein the user typing patterns comprise typing speeds of different characters.

12. The system of claim 9, wherein the monitored typing patterns of the end user comprise different typing speeds of different characters.

13. The system of claim 9, wherein the user typing patterns comprise a preferred character.

14. A computer program product for cognitive user identification recommendation, the computer program product comprising a computer readable storage medium having program instructions embodied therewith, wherein the computer readable storage medium is not a transitory signal per se, the program instructions executable by a device to cause the device to perform a method comprising:
    monitoring typing patterns of an end user as the end user enters data in different fields of different applications of a computing device having a device type;
    categorizing each of the applications according to application type and each of the fields according to field type;
    generating a data structure mapping the user typing patterns to each type of field and each type of application, the data structure modeling user input behavior of the end user; and,
    transmitting the data structure to a requesting application for use by the requesting application in prompting the end user to provide a particular type of password mapped to the modeled user input and consistent with a field type for which the password is required and a type of the requesting application, wherein prompting the end user includes providing a recommendation for the password based on the data structure.

15. The computer program product of claim 14, wherein the typing patterns of the end user are further monitored in different devices, each of the devices are categorized according to device type, the generated data structure further maps the user typing patterns to each type of device, and the particular type of password is further consistent with a type of device in which the requesting application executes.

16. The computer program product of claim 14, wherein the user typing patterns comprise an amount of repetitions of a field before the field is correctly entered.

17. The computer program product of claim 14, wherein the user typing patterns comprise typing speeds of different characters.

18. The computer program product of claim 14, wherein the user typing patterns comprise a preferred character.

19. The computer program product of claim 14, wherein the method further comprises monitoring the end user to determine the end user's affinity for the recommended password.

20. The computer program product of claim 14, wherein the recommendation is generated based on a password length requirement of a field of the application of the device.

* * * * *